March 23, 1965 V. LODHOLM ETAL 3,174,777
HOSE CONNECTOR FITTINGS
Filed June 20, 1960 4 Sheets-Sheet 1
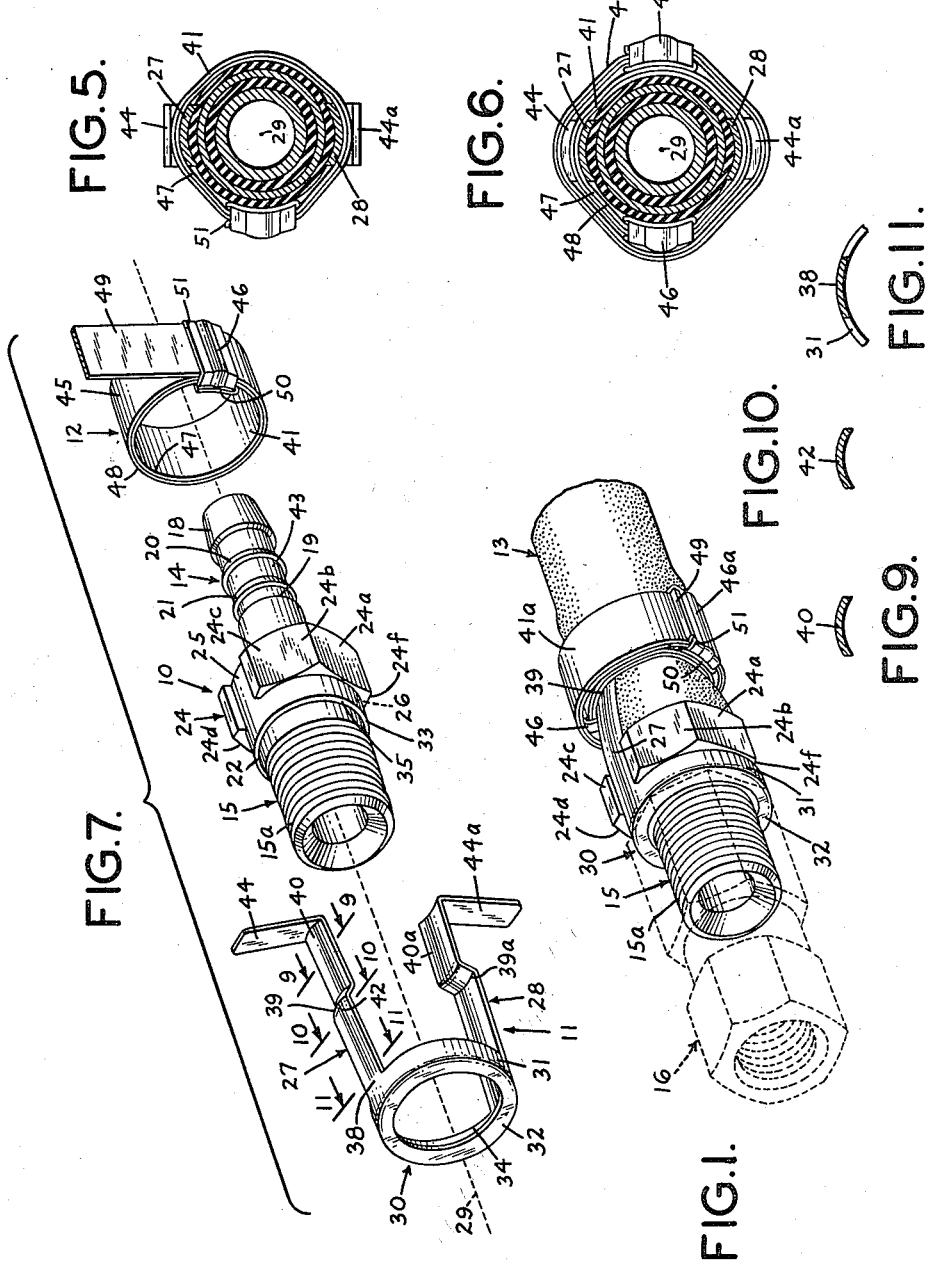

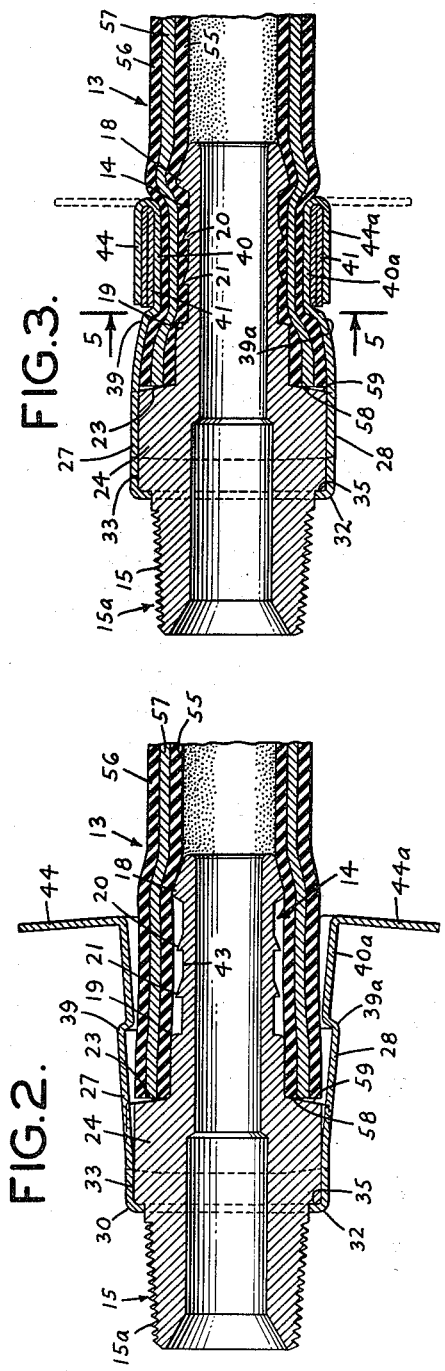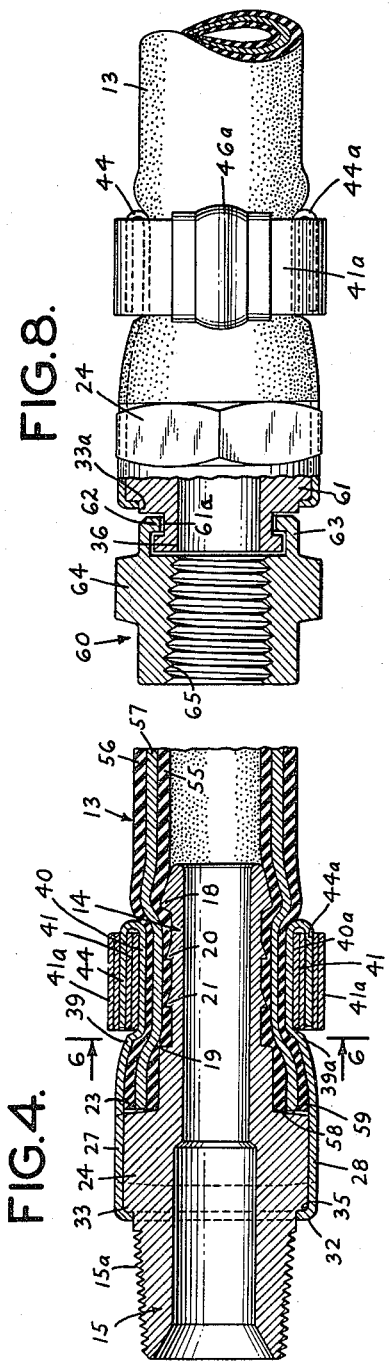

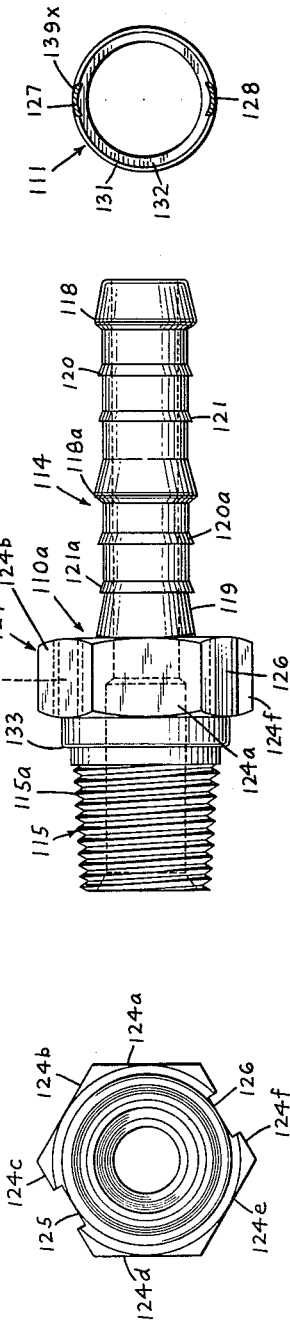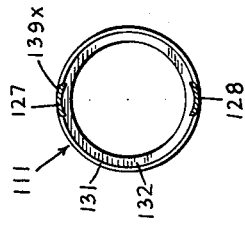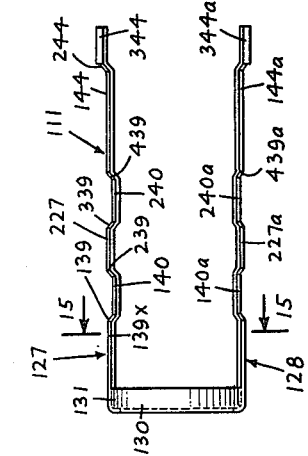

March 23, 1965 V. LODHOLM ETAL 3,174,777
HOSE CONNECTOR FITTINGS
Filed June 20, 1960 4 Sheets-Sheet 4
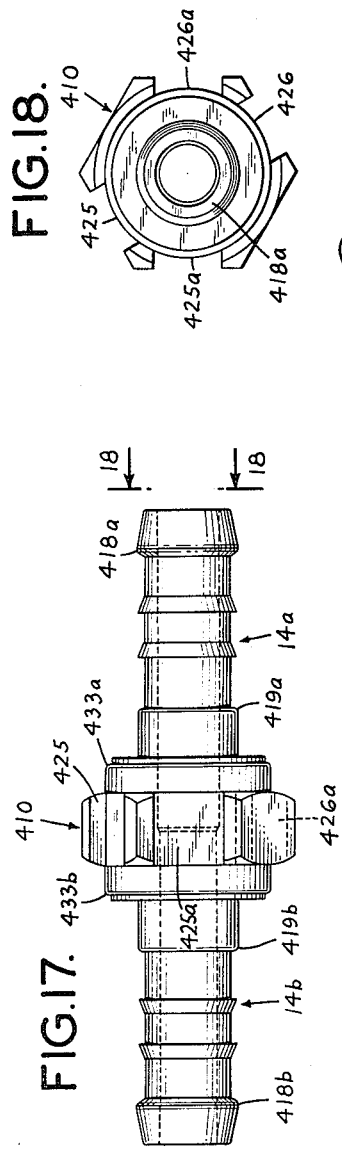
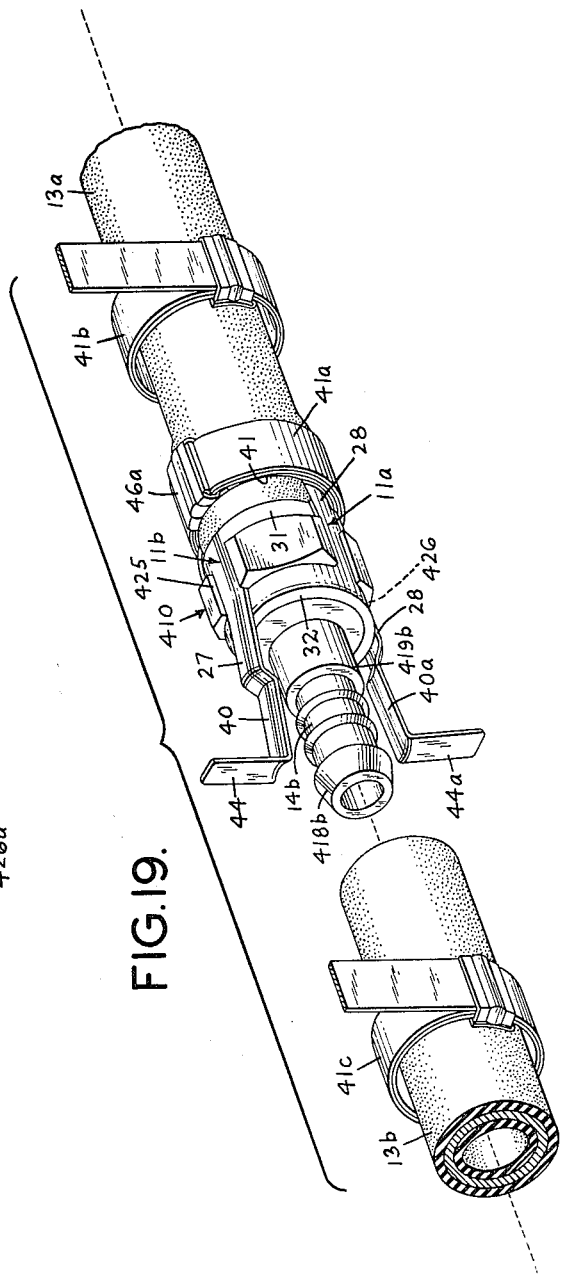

United States Patent Office 3,174,777
Patented Mar. 23, 1965

3,174,777
HOSE CONNECTOR FITTINGS
Valdemar Lodholm, Golden, and Jack M. Evans, Englewood, Colo., assignors, by mesne assignments, to Band-It Company, Denver, Colo., a corporation of Delaware
Filed June 20, 1960, Ser. No. 37,483
3 Claims. (Cl. 285—252)

This invention relates to fittings for clamping flexible hoses to connector-nipples.

The fittings referred to are of that type wherein an end portion of a length of flexible hose, such, for example, as reinforced rubber hose, is placed on a tubular nipple member and clamped thereon.

In many instances in which it is desired to transmit fluids under pressure, such, for example, as compressed air, it is necessary, or desirable, to secure the ends of rubber hoses or like flexible conduits to connector fittings which permit of connecting lengths of hoses together in a common conduit of considerable length. In many such instances it is desirable that the joined-together hose lengths be capable of carrying or withstanding high internal fluid pressure, such as high pressure compressed air, or the like, without leakage and also in such a way as to withstand rough usage without rupturing the hose or without undue wear upon the hose and the connector fittings. It is known, of course, that one of the primary functions of transmitting such fluid media under pressure is to convey the media from the source to the point of application, such as to equipment operated by or in conjunction with fluids such as, compressed air, being transmitted.

According to this invention a hose nipple fitting is provided which comprises a special arrangement of yoke, adapted to fit on a connector-nipple which has an end portion over which the end portion of a length of flexible hose is placed; the hose then being clamped on the nipple by a hose clamp which is also interlocked with the yoke, the other end portion of the connector-nipple providing means for connecting the connector to another similar connector-nipple or to some other suitable connection fitting.

Although the novel features which are believed to be characteristic of the invention are pointed out in the annexed claims, the invention itself as to its objects and advantages and the manner in which it may be carried out may be better understood from the description which follows, taken in connection with the accompanying drawings, forming a part hereof, in which FIG. 1 is a view in perspective of a fitting embodying the invention wherein is shown a flexible rubber hose connected to a hose connector-nipple by means of hose band clamps and the yoke interlocked therewith;

FIG. 2 is a view in section through the connector-nipple, hose and yoke prior to applying a hose clamp to illustrate the first step in assembling the elements which provide the high pressure connector assembly;

FIG. 3 is a view in section similar to FIG. 2, to illustrate a subsequent step in assembling the elements to form the completed assembly, this view showing the arms of the yoke bent to their final position after applying a first band clamp on the hose around the nipple portion of the connector-nipple;

FIG. 4 is a view in section similar to FIGS. 2 and 3, to illustrate the final step in assembling the elements, this view showing the completed assembly with the hose clamped to the nipple portion of the connector-nipple and the yoke and band clamps interlocked;

FIG. 5 is a view in section on line 5—5 of FIG. 3;
FIG. 6 is a view in section on line 6—6 of FIG. 4;
FIG. 7 is an exploded view in perspective showing metallic elements of the fitting, namely, the yoke, connector-nipple and a band clamp;

FIG. 8 is a side view, partly in section, of the assembled fitting but modified to accommodate a female connection having a threaded bore;

FIGS. 9, 10, and 11 are views in section respectively on lines 9—9, 10—10, and 11—11 of FIG. 7;

FIG. 12 is a view in elevation of another modification of a connector-nipple similar in construction to the connector-nipple shown in FIG. 7, this embodiment of the invention having a hose nipple part which is longer and designed to accommodate a modified form of yoke and two band clamps positioned in tandem as distinguished from one being superimposed upon the other as in the embodiment shown in FIG. 1;

FIG. 13 is an end view of the connector-nipple shown in FIG. 12;

FIG. 14 is a view in elevation of the yoke, used with the connector-nipple shown in FIG. 12;

FIG. 15 is a view of the yoke on line 15—15 of FIG. 14;

FIG. 16 is a sectional elevation of the completed assembly of parts illustrated in FIGS. 12 to 14;

FIG. 17 is a side view in elevation of another modification in the form of a hose mender;

FIG. 18 is a view on line 18—18 of FIG. 17; and

FIG. 19 is an exploded view in perspective showing a length of hose fitted and clamped on one end of the mender nipple illustrated in FIG. 17, ready to insert the other end of the mender nipple in another length of hose.

Referring now to the drawings, in which like reference characters indicated similar parts throughout the several views, the metallic parts of the fitting comprise a hollow connector-nipple part 10, a yoke 11 and a band clamp 12 (see FIG. 7). In the preferred embodiment of the invention two band clamps, such as clamp 12 are used. It will be understood, of course, that a length of flexible hose 13 is a part of the final assembly (see FIG. 1).

For convenience of description, the part 10 is referred to herein as a connector-nipple, inasmuch as it has a nipple portion 14 at one end for receiving the end of a hose and a threaded hollow boss 15 at its other end. The threaded portion in the preferred embodiment (FIGS. 1–7) is in the form of a male threaded part having a male thread 15a adapted to be screwed into a female connector part, which may be a female swivel connector 16 as shown in dotted lines in FIG. 1 or into any connecting part having a female mating part with a threaded bore. If a swivel adapter union, such as the female X female adapter 16, is used, then a connector-nipple 10 such as shown in FIG. 7 and having a male threaded part 15 may be used on both ends of a length of flexible hose, the appropriate connection being made between separate lengths of hose by an adapter such as the female X female adapter 16. However, if desired, a female X male swivel adapter may be used instead of the female X female adapter; such adapters being known in the trade. Also, if desired, a nipple portion like nipple 14 may be used in lieu of the threaded end and the connector nipple modified to provide a hose mender.

The nipple portion 14 of the connector-nipple 10, as well as the threaded portion, is hollow and of generally cylindrical shape and of such outside diameter that it may be pushed into the interior of the end portion of the flexible hose for which it is intended. For example, flexible hoses (made of reinforced rubber or plastic or other suitable material) will have a given internal diameter which will vary very little from hose to hose or from the hose of one manufacturer to the hose of another manufacturer, although the thickness of the hose wall, or its construction is such that hoses of a given internal diameter will vary as to its external diameter over a fairly broad range. Hoses will, for convenience, be referred to herein as rubber hoses but it will be understood that this will also include other flexible hoses which may be used for compressed air or other fluids.

The hose nipple part 14 at its outer end has an annular nib 18, an annular shoulder 19 at its inner end and annular beads 20, 21, spaced apart and intermediate the nib 18 and shoulder 19. As shown, these beads terminate in a sharp vertex, but they may be in other suitable cross-sectional shapes. The other end of the connector-nipple, as shown, is a hollow threaded boss 15 having a male thread 15a on its outer surface to mate with a corresponding female threaded bore. Intermediate the inner end 22 of threaded portion 15 and the inner end 23 of the nipple portion 14 is a ring 24 of larger diameter, this ring having a peripheral surface of generally polygonal shape. It is herein referred to as a tool ring inasmuch as it is designed to accommodate a suitable turning tool, such as a wrench. As shown, the tool ring 24 is hexagonally shaped, having hex sides 24 (a, b, c, d, e, f). This tool ring is commonly called the "hex." Side 24e, which is directly opposite 24a is not seen in FIGS. 1 and 7 but it will be understood that the hex ring is symmetrical. It is to be particularly noted that the sides 24c and 24f of the hex ring 24 are recessed longitudinally to form recesses 25 and 26 spaced 180° apart. These recesses, as explained later, are to receive the arms 27, 28 of the retaining yoke 11. The recesses are of a width and depth corresponding to the width and thickness of the arms 27, 28, of the yoke. The surfaces of the bottoms of the recesses are curved and lie in a cylindrical plane concentric with the axis 29 of the connector-nipple.

The yoke 11, which may be formed from flat plate or sheet steel stock, comprises a cup-shaped ring portion 30, having a cylindrical shaped side wall 31 and an inwardly turned annular flange portion 32. The cylindrical side wall 31 of this ring is of a diameter corresponding with the diameter of a yoke receiving annular shoulder 33 on the connector-nipple which is positioned intermediate the tool ring 24 and the inner end 22 of the threaded portion 15 of the connector-nipple. The size of the opening 34 defined by the flange 32 is such as to snugly fit over the shoulder ring 33 with the flange 32 abutting the flat circular edge 35 of the shoulder ring 33. Extending outwardly from the cylindrical ring 31 is a pair of oppositely disposed yoke arms 27, 28, spaced 180° apart to cooperate with the recesses 25, 26 in the tool ring 24. Inasmuch as both arms 27 and 28 are identical but "right and left-hand" to each other, it will suffice to describe only one in detail. The inner end 38 (that is the end next to ring 31) is curved in an arc having a radius of curvature the same as the radius of curvature of the surface of the recess 25 of the tool ring. (See FIGS. 7 and 11.) This radius of curvature of the arm is reduced toward an offset 39 which is a distance from the cup ring 30 to bring the offset 39 over the edge of shoulder 19 of the connector-nipple when the cup ring 30 is placed in engagement with its receiving shoulder 33 and the arm 27 is placed in a coaxial position (see FIGS. 4 and 5). The arm 27 outwardly from the offset 39 is provided with a band-receiving portion 40. This portion has a length corresponding to the width of the band clamp 41; that is, the length of the band-receiving portion is slightly greater than the width of the band so that the band may be recieved and engaged by it. The band-receiving portion 40 is in coaxial relation with the portion 38 of the arm and lies concentrically to the axis 29 of the nipple when it is in final locked position (see FIG. 4). The radius of curvature of the portion of the arm just inwardly of the offset 39 at 42 (see FIG. 10) is less than the curvature at 38 so that it corresponds generally with the curvature of the outside of the hose 13. The radius of curvature of the band receiving portion 40 is substantially the same as the curvature at 42, so that it will lie substantially concentric with the recessed beaded portion 43 of the nipple portion 14. The arm 27 terminates at its outer end in a flat fore-arm portion 44 bent outwardly from the end of band-receiving portion 40. This fore-arm portion 44 is of a length corresponding to the length of band-receiving portion 40. When in final locked position it is bent backwardly to overlie the band-receiving portion (see FIG. 4).

Inasmuch as yoke arm 28 is like arm 27 but opposite hand thereto, it is not described in detail. It will be noted that the counterparts are designated on arm 28 by the same reference numerals as for arm 27 with the sub-letter "a."

The remaining part of the metallic parts of the assembly are a pair of hose band clamps, which may be in the form of band clamp 41 (see FIG. 7). This type of band clamp comprises a band 45 fastened at its inner end 50 to a buckle 46, the band then formed into two loops 47, 48 extending through the buckle with its outer free end portion 49 also extending through the buckle 46. Preferably the clamp should be of stainless steel, but may in some instances be made of carbon steel, or other suitable metal. To clamp the band clamp on a hose, the loops are placed over the hose, the free end 49 is pulled through buckle 46 until the loops 47, 48 are drawn sufficiently taut around the hose and then the free end 49 is bent outwardly over the edge 51 of the buckle and sheered off flush with the top surface of the buckle 46 (see FIGS. 1 and 7). Hose clamps of this type and tools to facilitate their application to hoses are disclosed in United States patents to Mahn, No. 2,746,107, November 17, 1952; to Beardsley No. 2,746,324, November 3, 1952, and to Lodholm, No. 2,837,949, March 12, 1956. Band clamps such as illustrated herein are preferred because of the strength and neatness of the clamp when applied to a hose. However, other hose band clamps may be used provided they do not interfere with the locking action of the yoke and are such that one band clamp may be superimposed on the other without adversely affecting the locking action of the yoke.

The metallic fitting parts may be applied to produce the hose fitting assembly illustrated in FIG. 1, as follows:

The yoke 11 is slipped on to the connector-nipple part 10 so that the cup-shaped ring 30 engages its seating shoulder ring 33, as illustrated in FIG. 2; it being noted that the arms 27, 28 of the yoke are spread apart slightly and the arms are in registry with recesses 25, 26 in the hex tool ring 24. Also, it should be mentioned that the sub-assembly comprising connector-nipple 10 and yoke 11 is sold commercially as a unit to be used with hoses and hose band clamps from whatever source, although it is preferred to use band clamps of the type illustrated herein to insure full benefits of the invention.

The end portion of a length of flexible hose 13 is slipped over the nipple portion 14 of the connector-nipple 10. For example, the hose may be a reinforced rubber hose 13 which, as illustrated in the drawings may be hose of one-half inch internal diameter, the wall of which comprises an inner layer of rubber 55 and outer layer of rubber 56 and a carcass 57 therebetween for reinforcement, which may be textile or metallic cords or woven textile or metal fabric. There is a large variety of reinforced rubber hoses available on the market for carrying high internal fluid pressures.

The end 58 of the hose is brought into engagement with the annular flat portion 59 of the ring 24. A first band clamp such as clamp 41 is slipped over arms of the yoke. This may be done by placing the hose on the nipple, then applying the yoke and then slipping the band over the yoke from the threaded end of the fitting after the hose is inserted. In some instances the band may be inserted on the arms of the yoke before the hose is slipped over the nipple. The first band clamp 41 is positioned over the band-receiving portions 40, 40a of the yoke. The band is then pulled taut and the free end bent over the edge of its buckle and sheered off. The fore-arm portions 44, 44a of the yoke arms are then bent back and over the clamped band 41, as illustrated in FIG. 3. This may suffice in some instance to produce a hose, nipple and connector assembly sufficient for the internal pressures to be handled. However, it is preferable to apply a second band clamp 41a over the bent-back fore-arms 44, 44a of the yoke and superimposed over the first hose clamp 41. The second hose clamp 41a is applied in the same manner as the first clamp 41, except that the loops overlap the fore-arms 44, 44a of the yoke, whereas the loops of the first clamp 41 overlap the band receiving portions 40, 40a of the yoke. Also, it is preferable to place the buckles 46, 46a 180° apart and 90° from the yoke arms 27, 28. This produces the assembly illustrated in FIGS. 1 and 4.

It will be seen that the completed assembly provides a hose fitting assembly in which the hose is locked in three important places: the yoke ring 30 fits over the shoulder 33 of the connector-nipple; the fore-arms 44, 44a of the yoke are bent backward upon the first, or initial, clamp band 41 locking the yoke to the clamp; and the second, or top, band clamp 41a applied over the locking fore-arms 44, 44a of the yoke secures those ends completely, as well as making a permanent, locked-together assembly of nipple, hose, yoke, initial clamp and top-clamp, thus providing a triple locked assembly. Also, it should be noted that the offsets at 39, 39a on the yoke arms are forced downwardly back of the shoulder 19 of the nipple. The band clamps force the hose into the nipple groove. Hence, the hose, to be pulled off the nipple must be deformed to move off the nipple, under the clamp 41. Also, it is important to note that the recessed portions 40, 40a of the yoke arms not only receive the band clamps 41, 41a but these recesses form guides to position the clamps properly in relation to the groove in the nipple 14 between the shoulders 19 and 18.

The modification shown in FIG. 8 is like the assembly illustrated in FIGS. 1–7 of the drawings except that it does not have the male threaded hollow boss part 15 of connector-nipple. Instead it has a swivel female threaded union 60. The boss 61 extending from the shoulder 33a has an annular groove 61a into which is rolled or swaged an inwardly turned annular flange 62 which is formed from a neck portion 63 extending from a tool ring portion 64 which is hollow. The female swivel union is hollow to provide an internally threaded female bore 65. It will be understood by those skilled in the art that the swaged swivel 60 may be a male threaded member and there are other ways known of attaching a male or female connector to the hose nipple fitting.

The embodiment of the connector-nipple 110a illustrated in FIGS. 12 to 16, comprises a tool ring or "hex" 124, an annular shoulder 133, a hollow boss 115 having a male thread 115a. The faces 124c and 124f have grooves 125 and 126. In brief, these parts of the connector-nipple 110a may be similar in all respects to their counterparts as shown in FIG. 7. The nipple 114 at the other end is different from nipple 14 (see FIG. 7) in that it is longer and is provided with end nib 118, an intermediate annular nib 118a and an annular shoulder ring 119. Thus an annular groove is provided between nibs 118 and 118a and an annular groove, between nib 118a and shoulder ring 119. Annular beads 120, 121, and 120a, 121a are provided in these grooves.

The yoke 111 comprises a cup-shaped ring 130, and yoke arms 127, 128. The cup-shaped ring has a cylindrically-shaped side wall 131 and an inturned flat ring flange 132. The yoke arms 127 and 128 are similar; one being other hand to the other. It will suffice to describe arm 127 in detail.

The arm 127 at its end near the ring 130 has a radius of curvature which is the same as the ring side wall 131. It has an offset 139 a distance from the ring 130, to provide a band receiving portion or groove 140 and upwardly extending portion to provide an offset 239. Outward from offset 239 is a nib-overlying portion 227. An offset 339 and an upstanding portion 439 provide a band receiving portion or groove 240. Extending outwardly from receiving portion 240 is a cover arm portion 144. An offset 244 at the end of portion 144 has extending outwardly therefrom a finger portion 344, which mates with the groove portion 140 when the fore-arm portion 144 is bent back upon itself at the offset 439. The radius of curvature of the arm 127 near the offset 139 at 139x is slightly less than the radius of curvature at the ring 131. Also, the curvature of the finger 344 is reversed from the curvature of groove 140 so that it lies parallel with portion 140 when it is bent back to register with it.

As mentioned above, the yoke arm 128 is similar to yoke arm 127 but is the opposite hand thereto, the counterparts being indicated by similar characters of reference with the sub-letter "a."

The complete hose coupling assembly is illustrated in FIG. 16. To assume the parts, the free end of a length of hose is slipped over the nipple 114 until the end abuts the edge 159 of the hex ring 124. The yoke 111 is placed on the ring 124 so that the cup-shaped ring 130 engages shoulder 133 with the yoke arms 127, 128, extending in the direction of the hose. A band clamp 141 is placed over the yoke arms and hose and in the first band receiving portion 240. The hose band 141 is drawn taut and clamped in place. Then the fore-arm parts of the yoke arms 127, 128 are bent backwardly upon themselves at the bending point 439, 439a. It will be seen that the finger portions 344, 344a register respectively with the second hand receiving or groove portions 140, 140a of the yoke arms. Then the loops of a second hose band clamp 141a are slipped over the assembly to register with the second band receiving groove provided by the portions 140, 140a and the superimposed fingers 344, 344a. The hose band clamp 141a is then drawn taut and clamped. This completes the assembly. Other things being equal this assembly is capable of withstanding higher internal fluid pressures than the assembly illustrated in FIG. 4.

The connector-nipple 410 illustrated in FIGS. 17, 18, 19 is similar to the connector-nipple shown in FIGS. 1 to 4 except that a nipple 14a and a nipple 14b similar to nipple 14 is provided on opposite sides of the hex ring 424. This hex ring is similar to hex ring 24 except that hex ring 424 has two pairs of oppositely disposed yoke arm receiving grooves 425, 426 and 425a and 426a. When this type of connector-nipple is used (for example, as a hose mender) two yokes similar to yoke 11 are used. One yoke 11a is placed on the mender 410 with the arms 27, 28 extending in one direction and with the cup-shaped ring 30 engaging shoulder 433b and the other yoke 11b is placed on the mender with its arms 27, 28 extending in the opposite direction and with its cup-shaped ring 30 engaging the opposite shoulder 433a. The arms of each yoke overlie the cylindrical side wall 31 of the opposite yoke, as shown in FIG. 19. It will be observed that the pairs of yoke arms register with and fit grooves 425, 426 and 425a and 426a.

Although there are various ways of assembling the parts, one manner of doing so is as follows: Three unclamped band hose clamps like hose clamp 12 (see FIG. 7) are placed on the hose length 13a which is to be placed on nipple 14a. After the two yokes are placed on the connector nipple 410, as described above, hose 13a is placed on nipple 14a. The upstanding fore-arm portions 44, 44a (see FIG. 7) of the yoke 11a (see FIG. 19) are bent down sufficiently to permit one of the three above mentioned loose band clamps to be moved over the arms of the yoke. This clamp is then placed in position in the band receiving grooves of yoke 11a and clamped in place. Then the fore-arms of the yoke are bent downwardly upon the first clamp (see clamp 41, FIG. 19). Then a second clamp of the three mentioned above is moved into place where it is superimposed on the first clamp and clamped taut (see FIG. 19, 41a). This completes the assembly of the hose 13a, the yoke 11a and the clamps on nipple 14a; as shown in FIG. 19. Next, hose 13b is placed on nipple 14b, and the third clamp 41b (see FIG. 19) is moved over the previously assembled parts, into its position in the band receiving grooves 40, 40a of the yoke 11b and clamped in place. The fore-arm portions 44, 44a of yoke 11b are then bent downwardly into place. Finally, band clamp 41c, previously placed on hose 13b, is moved into place, superimposed on the previously clamped band 41b and is then clamped. This completes the assembly. It will be seen that the hose 13a (FIG. 19) is clamped and locked in substantially the same way on its nipple as the hose 13 (FIG. 1). Also, the hose 13b is clamped and locked on its nipple 14b in substantially the same way as hose 13a is clamped on to its nipple 14a, but is opposite hand thereto.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A coupling for high pressure hoses comprising: a coupling member having a central body portion with a nipple at one end and a coupling boss at the opposite end; a tool ring encircling said body portion having circumferentially spaced recesses therein; an annular abutment shoulder on said body portion between said tool ring and said boss having a cylindrical side wall and a flat annular edge; a nipple shoulder on said nipple adjacent said body portion; and a coupler for connecting a hose to said nipple by means of a band-clamp, said coupler comprising: a circular wall having a circular opening therein receiving said coupling boss and seating in abutment against said annular abutment shoulder with said wall seating against said cylindrical side wall; an upstanding flange on said wall seating over said flat annular edge; a plurality of elongate retainer arms attached to said flange seating in said recesses; and inset portions in each of said arms between its free end and its point of attachment to said flange constructed to receive a band-clamp for clamping said arms to a hose over said nipple, said inset portion bounded by an external shoulder on the side nearest said flange, said free end bent outwardly to form the other boundary of said inset portion, said external shoulder being located a distance from said flange so that it registers with said nipple shoulder.

2. A connector-nipple fitting comprising a hollow connector-nipple element having a hollow nipple part at one end and a hollow boss-like part at the other end attachable to another hollow member, said nipple part being insertable into the hollow end of a flexible hose with the inner surface of said hose engaging the outer surface of said nipple; a yoke element on said connector-nipple fitting having an annular abutting collar supporting locking arms; an annular ring member positioned intermediate of said nipple part and said hollow boss-like part; having circumferentially spaced recesses therein; said collar seating against said annular ring member; said locking arms seating in said recesses and extending longitudinally of said fitting and having intermediate insets adapted to engage the outer surface of said hose with their inner surfaces when said nipple is inserted therein and to mutually receive clamping means around their outer surfaces to clamp a hose in the inset, said arms having outer end portions constructed for bending over said clamping of means in said insets to secure it therein.

3. A connector-nipple fitting for insertion into the hollow end of a flexible hose which is clamped to the nipple by means of a hose band-clamp which fittingly comprises a first hollow connector-nipple element having a hollow nipple part at one end and a hollow boss-like part at the other end attachable to another hollow member, said nipple part being insertable into the hollow end of a flexible hose with the inner surface of said hose engaging the outer surface of said nipple; and a yoke element; said connector-nipple element having an intermediate tool ring member positioned intermediate of and joining said nipple part and said hollow boss-like part, an annular shoulder on said intermediate ring member, a longitudinal recess in oppositely disposed sides of said tool ring member, and said yoke element having an abutting ring part fitting over and abutting said annular shoulder on said intermediate ring and having retainer arms extending outwardly from said abutting ring part and over said recessed sides and seated in said recesses and extending longitudinally over said hollow nipple, said retainer arms on said yoke having offsets therein providing intermediate band receiving portions adapted to engage the outer surface of said hose when said nipple is inserted therein, and said arms having outer end-portions bendable over and engageable with a band-clamp after the band-clamp has been clamped over said intermediate band receiving portions of said arms and hose to secure said hose to said nipple.

References Cited in the file of this patent
UNITED STATES PATENTS

| | | |
|---|---|---|
| 134,158 | Nutting | Dec. 24, 1872 |
| 590,094 | Duncan | Sept. 14, 1897 |
| 714,243 | Sargent | Nov. 25, 1902 |
| 765,249 | McDonald | July 19, 1904 |
| 921,079 | Burtscher | May 11, 1909 |
| 1,066,935 | McDaniel | July 8, 1913 |
| 1,303,098 | Merz | May 6, 1919 |
| 1,473,537 | Bailey | Nov. 6, 1923 |
| 2,119,645 | Pearson | June 7, 1938 |
| 2,314,000 | Lusher | Mar. 16, 1943 |
| 2,522,684 | Mitchell | Sept. 19, 1950 |
| 2,958,549 | Spafford | Nov. 1, 1960 |